United States Patent [19]

Pasquier et al.

[11] Patent Number: 4,665,965

[45] Date of Patent: May 19, 1987

[54] CONTROL SYSTEM FOR ROLLER-BLINDS OR THE LIKE WITH SWIVEL BLADES

[75] Inventors: Henri Pasquier, Cluses; Dominique Jacquel, Marnaz, both of France

[73] Assignee: SOMFY, France

[21] Appl. No.: 795,613

[22] Filed: Nov. 6, 1985

[30] Foreign Application Priority Data

Nov. 16, 1984 [FR] France .............................. 84 17524

[51] Int. Cl.⁴ .............................................. E06B 9/20
[52] U.S. Cl. ........................................ 160/310; 160/7; 160/133
[58] Field of Search ........................ 160/133, 310, 1, 7

[56] References Cited

U.S. PATENT DOCUMENTS

| | | | |
|---|---|---|---|
| 3,355,149 | 11/1967 | Wiegelmann et al. | 160/310 X |
| 4,172,563 | 10/1979 | Werner et al. | 160/310 X |
| 4,372,367 | 2/1983 | Baldanello et al. | 160/310 |
| 4,411,348 | 10/1983 | Fillion | 160/310 X |
| 4,417,185 | 11/1983 | Bullat | 160/310 X |
| 4,452,292 | 6/1984 | Leivenzon et al. | 160/133 |

FOREIGN PATENT DOCUMENTS

| | | |
|---|---|---|
| 1266475 | 11/1968 | Fed. Rep. of Germany . |
| 2907915 | 9/1980 | Fed. Rep. of Germany ...... 160/310 |
| 2562736 | 10/1985 | France ................................. 160/310 |

Primary Examiner—Ramon S. Britts
Assistant Examiner—David M. Purol
Attorney, Agent, or Firm—Kane, Dalsimer, Kane, Sullivan and Kurucz

[57] ABSTRACT

This control system for a roller-blind or the like comprising swivel blades coupled to a master blade carrying at one end a stud adapted, during its downward movement, to travel in a slide groove disposed behind a rocker and, during its upward movement, to engage both the slide groove, and the rocker, this control system comprises a microcomputer having stored in its non-volatile memory a control program of which the instruction groups are adapted to control the stud movements and the blind movement in relation to four predetermined stop points with respect to the rocker. The movements of the blind and of its stud are controlled as a function of the relative state of two switches of an auxiliary device rotatably coupled to the winding tube of the blind, as a function of the 1 or 0 state of a first register which assumes state 1 only when the stud is inside the rocker and also as a function of the 1 or 0 state of a second register which assumes state 1 only when the stud has overstepped at least once the first upper point after the last switching-on of the system, the first and second registers being incorporated in the non-volatile memory of the microcomputer.

4 Claims, 7 Drawing Figures

CONTROL SYSTEM FOR ROLLER-BLINDS OR THE LIKE WITH SWIVEL BLADES

BACKGROUND OF THE INVENTION

1. Field of the Invention

The present invention relates to control systems for roller-blinds or similar structures.

More particularly, the invention relates to a control system for roller-blinds or like structures adapted to be rolled up, which is actuated by an electric motor and reduction gear unit associated with an automatic stop-motion device for stopping the operation of this unit when the roller-blind is in anyone of its two end positions, that is, the upper or lower position.

This roller-blind comprises a plurality of swivel blades kinematically connected to a master blade having at least one end provided with a stud adapted to cooperate with a corresponding fixed rocker. Each rocker comprises, for engagement by said stud, a downward inlet and an upward outlet interconnected by a hollow guide path substantially parallel to the lateral slide grooves of the blind. This hollow guide path has an inclined lower extension diverging from the lateral slide groove and a resilient "lock" permitting the passage of said studs through said inlet only in the upward direction. The control system further comprises, for each stud, a first lower stop point formed in the slide groove above the rocker inlet; at this lower stop point the downward movement of the stud is adapted to be discontinued temporarily; a first upper stop point located in said hollow guide path above the rocker outlet and whereat the upward movement of the stud is also adapted to be discontinued temporarily; a second lower stop point located substantially at the end of said inclined lower extension which correspond to a maximum orientation of said master blade, and a second upper stop point located in the slide grooves above the rocker outlet and whereat the upward movement of the stud is adapted to be discontinued temporarily after said stud has left the hollow guide path of said rocker. The control system further comprises two switches the operation of which is linked to the rotation of the roller-blind winding tube kinematically connected in turn to the motor and reduction gear unit, one of said switches assisting in stopping the motor and reduction gear unit when said stud is at its first upper stop point.

2. The Prior Art

In a known control system of this type (GRADHER-METIC), disclosed in German Pat. No. 1,266,475 to Grau, it is the automatic stop motion device provided for stopping the blind when the latter is fully rolled up or unrolled, which, through its switch controlling the stopping of the blind in its unrolled position, determines simultaneously the first lower stop point of the stud. This additional role of the automatic stop device of the roller-blind consists in providing a functional combination between the blind unrolling movement and the angular setting of the blind blades, so that additional conductors must be provided between the automatic stop motion device and the control case of the control system. Therefore, since the automatic stop motion device is incorporated in the motor and reduction gear unit driving the blind, the wires leading from this unit must compulsorily have special properties and this requirement increases, from the economical standpoint, the difficulty of manufacturing economically a complete range of motor and reduction gear units of different power ratings in parallel with a standard range of existing units of this character.

Besides, in the same prior art control systems, the control switches are connected by twelve to sixteen electrical conductors to the motor and reduction gear unit, to the automatic stop motion device and to the auxiliary double-switch device. This large number of conductors increases the difficulty of installing the motor and reduction gear unit and the control means on the site.

On the other hand, the two switches of the auxiliary device are utilized for controlling directly the stoppage of the motor and reduction gear unit, one switch controlling directly the stoppage of the motor and reduction gear unit, one switch controlling directly this stoppage when the stud is at its first upper stop point, and the other switch controlling directly this stoppage when the stud is at its second upper stop point. It is therefore necessary to use an additional switch for controlling the stoppage of the stud at its second lower stop point, along the inclined extension of the guide path. This additional switch controlling not a low-voltage current but the main voltage current, is housed in a rocker, and two additional electrical conductors are necessary for connecting this rocker to the case of the control device, thus further complicating the installation on the site.

Finally, it is clear that many additional electrical conductors are necessary, and that all these conductors are connected to the case of the control device containing or not the push-botton switches for controlling the movements of the roller-blind and of the swivel blades thereof. The control device according the prior art, which operates electromagnetically, involves the use of a relatively large number (seven) of push-button switches for controlling the blades. The first switch controls the unrolling movement, the second switch controls the rolling movement, the third switch controls the stoppage, the fourth switch controls the swivel movement of the blades to the desired angular position, the fifth and sixth switches control the more or less considerable orientation of the blades, and the seventh switch controls the downward movement of the blind from the orientation position. Even if one disregards the constructional and structural complexity of a control device comprising such a large number of push-button switches, this large number makes the operation of the device particularly complicate for the user. In fact, for carrying out certain control operations, the user may tend to hesitate before selecting the push-button corresponding to the desired movement of the roller-blind. Thus, just for unrolling the blind, the user is confronted with two push, buttons, one to be depressed if the blind is in its desired orientation position, the other to be depressed when the blind is in a position other than this specific orientation position. On the other hand, to move the blind from any intermediate position to a position of maximum orientation, the user must perform three successive operations, each operation being followed by a blind displacement step, and subsequently a reflection time is necessary for the user for selecting the push-button to be depressed. It is the object of the present invention to provide a control system in which the device for automatically stopping the blind in the rolled-up or unrolled position does not play any role in the determination of the first lower stop point of the above-defined stud, and consequently in the blade orientation.

SUMMARY OF THE INVENTION

The control device according to the present invention is characterised by the fact that the auxiliary device consists simply of a two-switch means for detecting the position of the above-defined stud, one switch assisting in stopping the motor and reduction gear unit when the stud is at its first upper stop point, and other switch assisting in stopping the motor and reduction gear unit in a predetermined lower position of said blind, which determines for the stud either the first lower stop point if the stud is in the slide groove, or the second lower stop point if the stud is in the inclined extension of the hollow guide path. Under these conditions, the stud is liable to be located in any one of three possible sections: either between one of the lower stop points and the first upper stop point, or at the first upper stop point or above this point, or at one of the lower stop points, or below the first lower stop point, these sections corresponding to three relative states of the two switches, for instance either the first switch closed and the second switch open, or the second switch closed and the first switch open, or both switch in the same state, open or closed. Other control switches M,D,PL,MS and the two switches of the auxiliary device are connected via input interfaces to the input terminals of a microcomputer having its output terminals connected to two output interfaces respectively, adapted to actuate the motor and reduction gear unit in one or the other directions of rotation, respectively. The non-volatile memory of the microcomputer stores a control program for the motor and reduction gear unit, which is intended for determining which control switch or switches has or have been actuated, checking the validity of the orders delivered by said switches and transmitting said orders to the motor and reduction gear unit, as a function of the relative state of the switches of said auxiliary device and/or as a function of the state 1 or 0 of a first register of the volatile memory of the microcomputer, this state corresponding or not, respectively, to a predetermined position of said stud in the rocker between the second lower stop point and the first upper stop point. The second upper stop point position of said stud is determined according to a time-lag triggered by the control program when the stud moves past the first upper stop point toward the rocker outlet.

This arrangement represents a much simpler structure for the complete control system consisting on the one hand of a standard motor and reduction gear unit incorporating a device for stopping automatically the blind in its two end positions, this unit being adapted to be connected to the control case by means of only four conductors, this case being connected in turn by means of five conductors to the control switches, and on the other hand of a standard auxiliary device possibly identical with the automatic stop motion device, adapted to be assembled on the site in the roll-up tube end opposite the motor and reduction gear unit, thus requiring only three conductors for connecting this standard auxiliary device to the control case, no additional switch being necessary within the rocker which under these conditions does not require any electrical connection with the control case. Thus, the installation of the complete control system is simplified to a considerable extent. Finally, the number of control switches is particularly small (only four), and the user operates only once the switch or switches corresponding to the desired final position of the roller-blind, the control system carrying out by itself the successive operative steps possibly necessary for obtaining this final position, and on the other hand only one switch is provided for controlling the blind unrolling operation, irrespective of the blind position, whether its blades are oriented or not, when the unrolling order is issued.

THE DRAWINGS

In the accompanying drawings a typical form of embodiment of the present invention is illustrated by way of example.

DESCRIPTION OF THE PREFERRED EMBODIMENT

Figure 1:
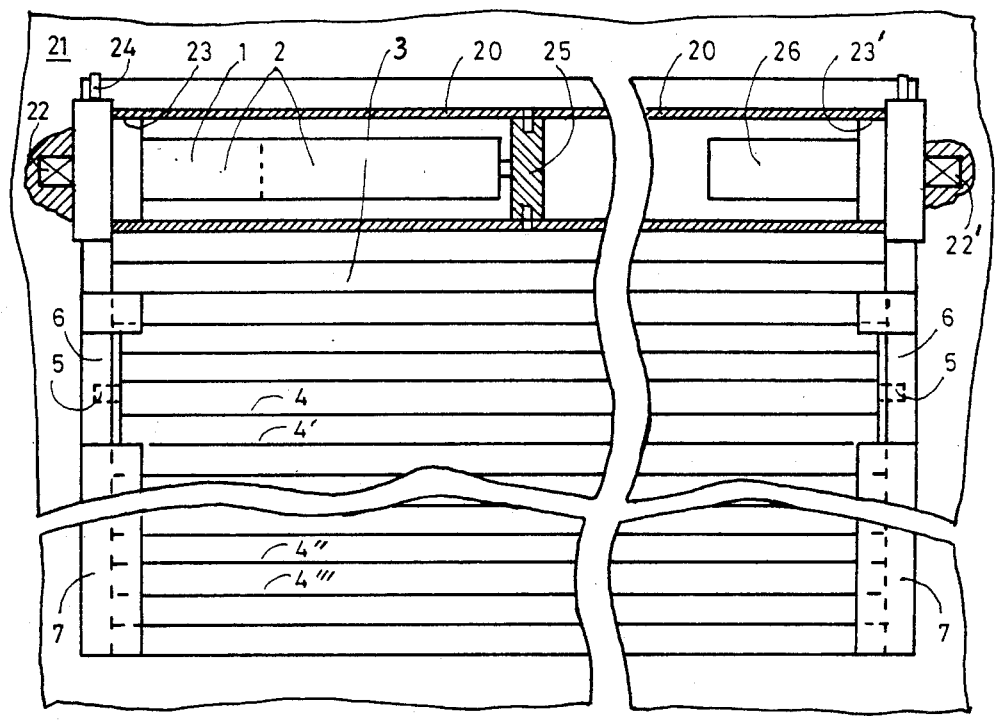
FIG. 1 is a fragmentary sectional view of this specific form of embodiment.

The control system shown in FIGS. 1-4 comprises an automatic stop motion device 1 adapted to stop a blind 3 in its "roller-up" and "unrolled" positions. This automatic stop motion device 1 is an integral part of a tubular motor and reduction gear unit 2 adapted to be enclosed in a roll-up tube 20 of blind 3. This motor and reduction gear unit 2 is locked against rotation in the window-recess 21 by a square-sectioned stub shaft 22. It further comprises a rotating bearing 23 rigidly coupled to the tube 20, and a pair of serrated rollers 24 permitting the quick adjustment of the end stop positions of the blind. The motor shaft is drivingly coupled to a rotating member 25 having its outer periphery coupled by means of radial pins to the inner wall of the winding tube 20 so that it can cause the tube 20 to rotate. This automatic stop motion device 1 is of a type already known per se, such as described and illustrated for example in the French Pat. Nos. 2,076,529 and 2,455,695.

The blind 3 comprises a plurality of swivel blades 4', 4'', 4''', . . . kinematically connected in a manner known per se to a master blade 4 carrying at either end a stud 5 adapted to cooperate with a fixed "rocker" 6 disposed along the corresponding slide groove 7. Each rocker 6 comprises an inlet 8 facing downwards and consisting of a resilient blade 9 protruding in its inoperative position in the slide groove 7. Each rocker 6 further comprises an outlet 11 facing upwards and consisting of another resilient blade 12 which, in its inoperative position, is coplanar with one side of said slide groove 7 and adapted to be deflected resiliently in the direction of the arrow 13 (FIG. 4) inside the slide groove 7. The inlet 8 and outlet 11 are interconnected by a hollow guide 14 substantially parallel to slide groove 7. This hollow guide 14 has a lower extension 16 inclined in the direction of the arrow 15 so as to diverge from the slide groove 7. The stud 5 is dimensioned to permit its passage through the inlet 8, the hollow guide 14, the inclined hollow guide extension 16, and the outlet 11. A "lock" 17 consisting of a resilient blade 18 is adapted, when deflected in the direction of the arrow 33 (FIG. 3) to permit the ingress of stud 5 through said inlet 8 but only in the upward direction, according to the direction in which the blind is rolled up.

The control system further comprises, as shown in FIG. 1, an auxiliary device 26 disposed for example within the ene of the winding tube 20 which is opposite the end containing the motor and reduction gear unit 2. This auxiliary device 26 comprises a rotating bearing 23' rigidly coupled to the tube 20 and mechanism for kinematically and rotatably coupling this tube 20 with a member adapted to actuate a first switch 32 incorporated in said auxiliary device 26. The auxiliary device 26 is held against rotation in the window-recess 21 by means of a square-sectioned stub shaft 22', and may advantageously but not compulsorily be identical with or similar to the automatic stop device 1.

Figure 2:
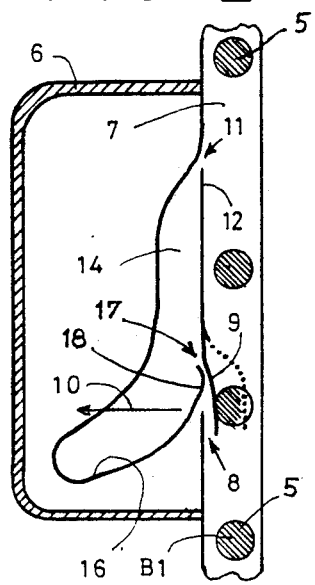
FIGS. 2, 3 and 4 illustrate in section as from the right-hand side of Fig. 1 the rocker of the same form of embodiment, during different steps of its operation.
Figure 3:
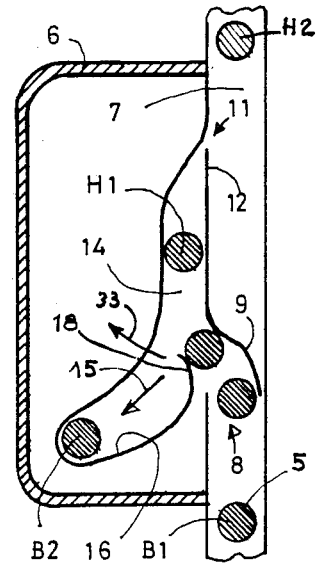
Figure 4:
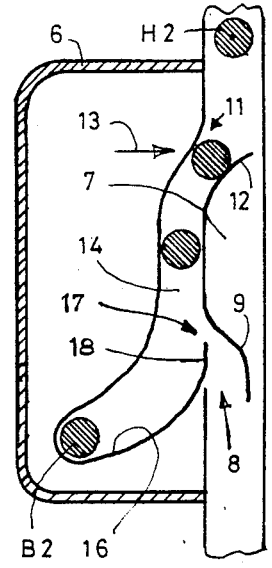

The control system comprises four specific stop points for the stud 5 with respect to the rocker 6. At a first lower stop point B1 the stud 5 engages the slide groove 8 (FIG. 2). At a second lower stop point B2 the stud 5 is at the end of the inclinded extension 16 remotest from slide groove 7, this second lower stop point B2 corresponding to a maximum orientation of master blade 4. The positions of the two lower stop points B1 and B2 are determined by a same stoppage position of the blind. At a first upper stop point H1 (FIG. 3) the stud 5 engages the hollow guide path 14 below the outlet 11 of rocker 6. At a second upper stop point H2 (FIG. 4) the stud 5 is located above this outlet 11 in the corresponding slide groove 7. Switches 31 and 32 are used only for detecting the passage of stud 5 at the upper stop point H1 or at one of the lower stop points B1 or B2, respectively, as the case may be. For this purpose, in this example, the open and closed positions of switches 31 and 32 are so pre-adjusted that, as shown diagrammatically in the chart of FIG. 6, when the stud is located between one of the lower stop points B1 or B2 and the upper stop point H1, both switches are open. When the stud is at the upper stop point H1 or below this position, switch 31 is closed, switch 32 remaining open. When the stud is at one of stop points B1 or B2, or below B1, switch 32 is closed, switch 31 remaining open.

Figure 5:
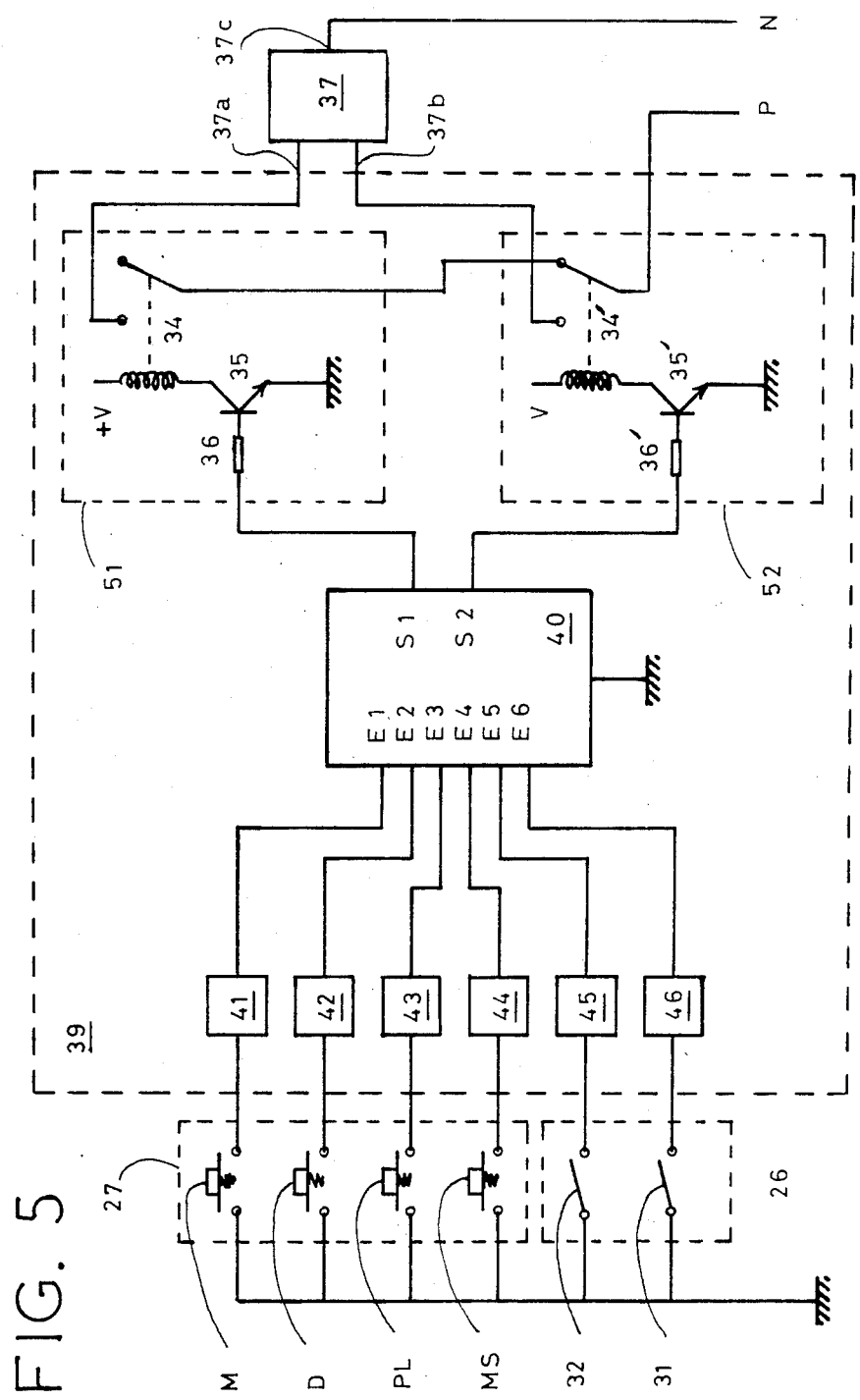
FIG. 5 is a wiring diagram of the same form of embodiment.

The control device comprises an electronic system 39 incorporating, as shown in FIG. 5, a microcomputer 40 such as for example an INTEL 8748 microcomputer, input interfaces 41-46 and two output interfaces 51 and 52. The input terminals E1 and E6 of microcomputer 40 are connected to the input terminals of input interfaces 41-46, respectively. The input terminals of input interfaces 41 and 42 are connected to the first terminals of a pair of push-button switches M and D having each a momentary operative position, the first switch M being adapted to control the upward movement (winding movement) of the blind, the second switch being adapted to control the downward movement (unrolling) of the blind. The input terminals of input interfaces 43 and 44 are connected to the first terminals, respectively, of a pair of push-button switches PL and MS having a momentary operative position and adapted, when actuated simultaneously, to control the position of each stud 5 within its rocker. When the first switch (PL) or the second switch (MS) are subsequently actuated separately, they control a greater or smaller orientation of the master blade 4. The input terminals of input interfaces 45 and 46 are connected to switches 32 and 31, respectively. The second terminals of switches M,D,PL,MS,32 and 31 are grounded jointly. Switches M,D,PL and MS are enclosed for example in a control box or case 27.

The two output terminals S1 and S2 of microcomputer 40 are connected to the input terminals, respectively, of the two output interfaces 51 and 52. The output interface 51 comprises for instance a relay 34 having a back contact and a front contact, the latter controlling the rotation of the motor in a predetermined direction, for example for rolling up the blind. The coil of relay 34 is connected on the one hand to the +V terminal of a d.c. supply and on the other hand to the collector of a transistor 35 having its emitter grounded, the base of this transistor being connected to output terminal S1 via a resistor 36. The output interface 52 is coupled in a similar manner to the output of interface 51 and controls the motor rotation in the opposite direction, for example in the blind unrolling or lowering direction, in the present example. The base of its transistor 35' is coupled to output terminal S2 via a resistor 36'. The first terminal 37a of motor 37 is connected to the front contact of the relay 34' of interface 52. The third terminal 37c of motor 37 is connected to the neutral N of the supply mains. The common contact of relay 34 is connected to the back contact of relay 34'. The common contact of relay 34' is connected to the phase P of the supply mains.

The microcomputer 40 comprises in its volatile memory notably a first register R1 adapted to assume a state 1 when stud 5 is in the rocker 6 between stop points H1 and B2, and a state 0 in the opposite case or after restoring the mains supply subsequent to a break-up of the latter. It also comprises, in its volatile memory, a second register R2 adapted to assume a state 1 when the stud has been positioned at least once in the first upper stop point H1 or above this first upper stop point since it was energized.

In fact, when a break-up occurs in the mains supply while the stud is between stop points B1 or B2, and H1, in the rocker or in slide groove 7, the first register R1, having been caused to assume inopportunely the other state 0 as a consequence of the current break, is no more capable of reliably indicating whether the stud is in the rocker or in the slide groove. The second register R2, in this case, is able to deliver through the resetting thereof to state 0 the reliable information that a power failure (which is accidental in this case) took place because the stud at no time was at stop point H1 or above this stop point H1 since the power supply was restored, and that it is not possible to stop the stud between stop points B1 and H1 while the blind is being rolled up.

Figure 7:
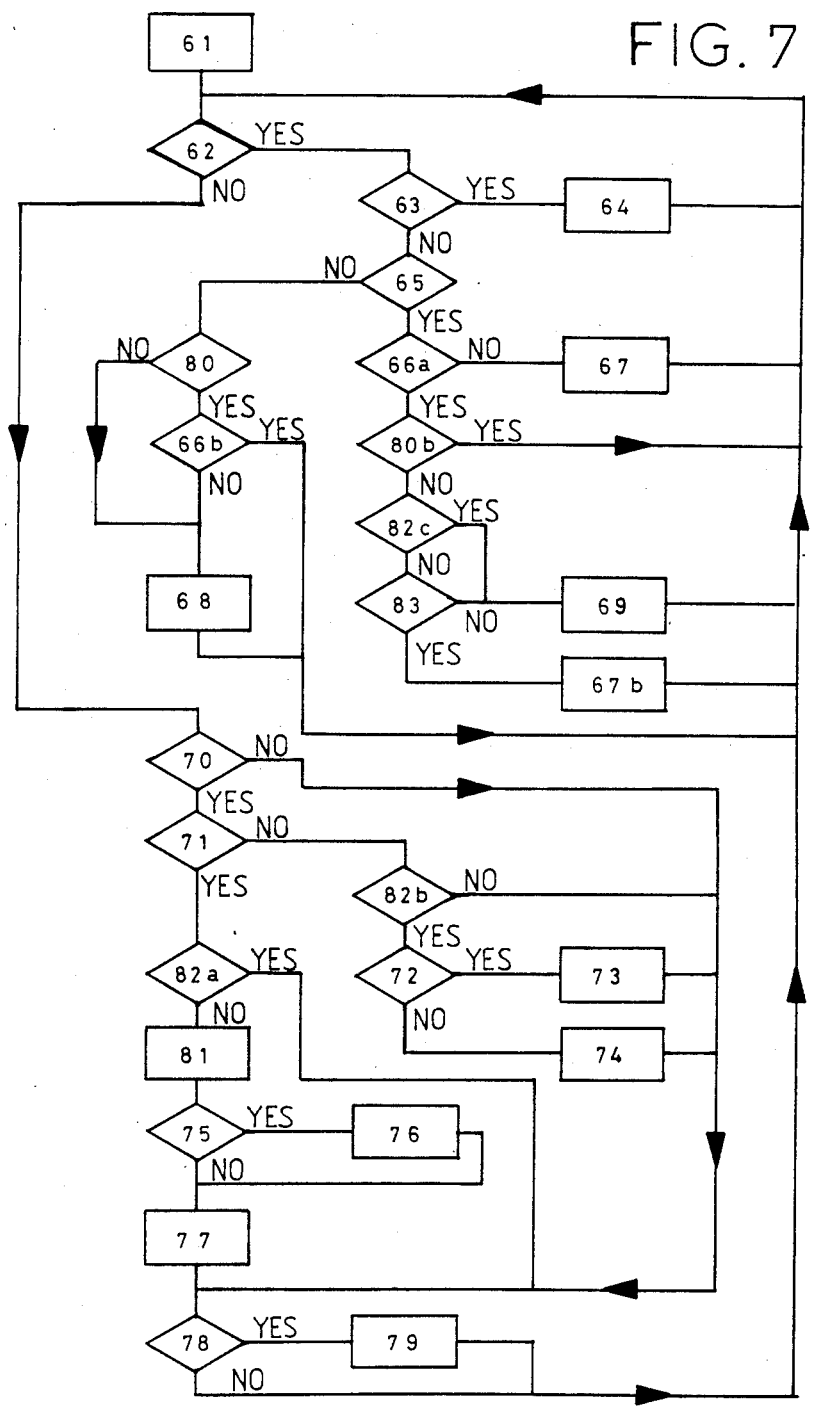
FIG. 7 illustrates the chart of the control program contained in the non-volatile memory of the microcomputer.

The microcomputer 40 comprises a non-volatile memory containing a control program of which the instruction groups are shown in the chart of FIG. 7. The instruction group 61 for initializing and setting to state 0 the first register R1 comprises instructions of which the last one precedes the first instructions of an instruction group 62 for checking by depressing at least one of switches M or D, of which the last instruction is a conditional call instruction to an instruction group 70 adapted to check if at least one of switches MS or PL is actuated, or to the address of the first instruction of an instruction group 63 for checking by depressing switch M alone.

The last instruction of instruction group 63 is a conditional call instruction to the address of the first instruction of another instruction group 65 for checking by depressing switch D alone, or to the address of the first instruction of an instruction group 64 adapted to store and carry out the order for winding up the blind completely, for setting the first register R1 in state 0 and setting the second register R2 in state 1. The last instruction of instruction group 64 is an unconditional call instruction to the first instruction of instruction group 62.

Figure 6:
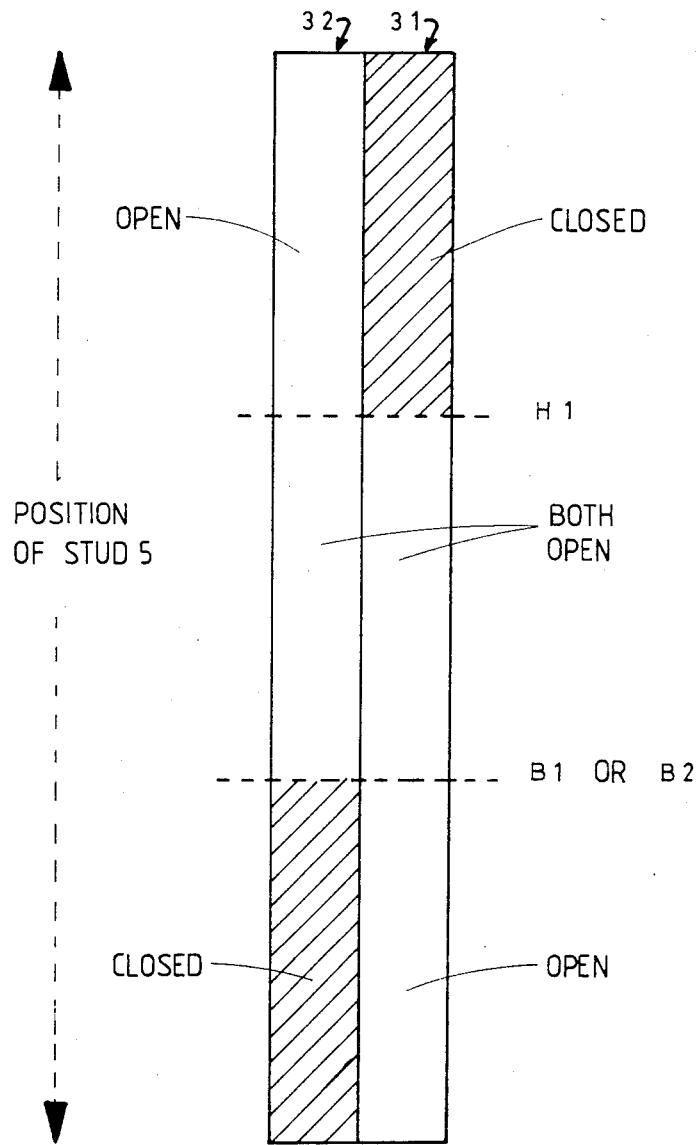
FIG. 6 is a diagrammatic illustration of the relative positions of the two switches of the auxiliary device as a function of the position of the stud with respect to two lower stop points B1 or B2, and to the first upper stop point H1.

The last instruction of instruction group 65 is a conditional call instruction to the address of the first instruction of an instruction group 80 for checking a rolling-up in course, or to the address of the first instruction of an instruction group 66a for checking the identical state of switches 31 and 32, this state corresponding to the fact that the stud 5 is located between one of the lower stop points B1 or B2 and the first upper stop point H1 (FIG. 6).

The last instruction of instruction group 80 is a conditional call instruction either to the address of the first instruction of an instruction group 66b for checking the identical state of the two switches 31 and 32, this state corresponding to the fact that the stud is located between stop points B1 and B2, or to the address of the first instruction of an instruction group 68 for controlling the stoppage of the blind. The last instruction of instruction group 66b is a conditional call instruction to the address of the first instruction of instruction group 62 or to the address of the first instruction of instruction group 68. The last instruction of instruction group 68 is an unconditional call instruction to the first instruction of instruction group 62.

The last instruction of instruction group 66a is a conditional call instruction either to the address of the first instruction of an instruction group 67 provided for memorizing and carrying out the order for closing the blind completely, or to the address of the first instruction of an instruction group 80b for checking that the rolling-up of the blind is in course. The last instruction of instruction group 67 is an unconditional call instruction to the first instruction of instruction group 62.

The last instruction of instruction group 80b is a conditional call instruction either to the address of the first instruction of instruction group 62 or to the address of the first instruction of an instruction group 82c for checking the state 1 of the first register R1. The last instruction of instruction group 82c is a conditional call instruction either to the address of the first instruction of an instruction group 83 for checking the state 1 of register R2, this state corresponding to the fact that stud 5 was positioned at least once above the first upper stop point H1 since the device was switched on, or to the address of the first instruction of an instruction group 69. This instruction group 69 is provided for sequentially storing the order for unfolding the blind, carrying out an order for rolling the blind up to the first upper stop point H1, then up the second upper stop point H2 determined by the time-lag started by predetermined instructions from group 69 when the stud 5 moves away from the first upper stop point H1 towards the outlet 11. This instruction group 69 is adapted to eventually control the complete unrolling of the blind and subsequently causing the first register R1 to assume the 0 position. The last instruction from instruction group 69 is an unconditional call instruction to the address of the first instruction of instruction group 62. The last instruction of instruction group 83 is a conditional call instruction either to the address of the first instruction of instruction group 69, or to the address of the first instruction of an instruction group 67b for storing and unfolding the blind completely, the last instruction of this group consisting of an unconditional call instruction call instruction to the first instruction of instruction group 62.

The last instruction of instruction group 70 is a conditional call instruction, either to the first instruction of instruction group 78 for checking the presence of the stud just at stop points H1 or H2, or to the first instruction of an instruction group 71 for checking the simultaneous depression of switches MS and PL. The last instruction of instruction group 71 is a conditional call instruction either to the address of the first instruction of an instruction group 82a or to the address of the first instruction of an instruction group 82b, both groups 82a and 82b being provided for checking the 1 state of the first register R1 which corresponds to the fact that stud 5 is in the rocker between stop points B2 and H1.

The last instruction of instruction group 82b is a conditional call instruction either to the address of the first instruction of instruction group 78, or to the address of the first instruction of an instruction group 72 for checking the depression of switch PL. The last instruction of this instruction group 72 is a conditional call instruction either to the first instruction of an instruction group 72 for controlling the upward movement of stud 5 up to the first upper stop point H1 if switch MS remains depressed, or to the address of the first instruction of an instruction group 73 for controlling the downward movement of stud 5 to the second lower stop point B2 if switch PL remains depressed. The last instructions from instruction groups 74 and 73 respectively are unconditional call instructions to the first instruction of instruction group 78.

The last instruction from instruction group 82a is a conditional call instruction either of the address of the first instruction of instruction group 78 or to the address of the first instruction of an instruction group 81 for storing the order for introducing the stud into the rocker, the last instruction of this group being an unconditional call instruction to the first instruction of an instruction group 75 for checking the open state of switch 32 which corresponds to the fact that the stud is located above the first lower stop point B1.

The last instruction from instruction group 75 is a conditional call instruction either to the address of the first instruction of an instruction group 77 for sequentially controlling the upward movement of stud 5 up to the first upper stop point H1, causing the second register R2 to assume state 1, or to the address of the first instruction of an instruction group 76 for controlling the downward movement of stud 5 toward the first lower stop point B1, of which the last instruction is an unconditional call instruction to the first instruction of instruction group 77.

The last instruction of this instruction group 77 is an unconditional call instruction to the first instruction of the above-mentioned group 78. The last instruction of this instruction group 78 is a conditional call instruction either to the address of the first instruction of instruction group 63 or to the address of an instruction group 79. This group 79 is adapted to control a brief rotation of the motor and reduction gear unit in the direction opposite to the preceding direction of rotation, until switch 31 is re-opened, stud 5 being brought simultaneously above the second lower stop point B2 (FIG. 6) in this example.

The last instruction of instruction group 79 is an unconditional call instruction to the address of the first instruction of instruction group 62.

Assuming that the blind is initially in its fully unrolled or lower position. When the control device is energized from the supply mains, the instruction group 61 resets to zero the contents of the volatile memory of the microcomputer and enables the use of the time-lag counter thereof. The instruction group 62 checks whether one of push-button switches M or D has been actuated or not and if the answer is no, the instruction group 70 checks whether stud 5 is located at one or the other of stop points H1 or B2. If not, the motor and reduction gear unit is not actuated and the blind remains in its unrolled condition.

If, during the energization of the system, the blind is so rolled up that the stud is located above the first upper stop point H1, so that switch 31 is closed, the instruction group 61, after resetting to zero the contents of the volatile memory and permitting the use of the time-lag counter, cause the second register R2 to assume the 1 state. The instruction from groups 62,70 and 78 are subsequently delivered as explained hereinabove, and the blind remains in its fully rolled-up condition.

If the user, while the blind is unfolded completely or in its lowermost position, wishes to wind up the blind completely, he just depressed briefly the UP push-button switch M. The instruction group 62 checks that one of switches M or D has actually been depressed, and if yes, the instruction group 63 checks that only switch M was actuated. If the answer is yes, the memory of instruction group 64 stores and carries out the order for winding up the blind completely, this movement taking place until the automatic stop motion device 1 stops the motor and reduction gear unit 2. When the stud, during this blind winding operation, moves past the first upper stop point H1, switch 31 is closed and the instruction group 64 causes the first register R1 to assume state 0 and the second register R2 to assume state 1.

If the user then wishes to close the blind completely (unroll movement), he depresses briefly the DOWN push-button D. When the checking instructions of groups 62 and 63 have been carried out, the answer to group 63 being a negative one, the instruction group 65 now checks whether only switch D was actuated, and if the answer is yes, the instruction group 66a ascertains if the state of switches 31 and 32 is the same or open state. The answer is no, since these switches are in different states, 31 closed and 32 open, and stud 5 is not located between stop points B1 or B2 and H1, but below this last-mentioned upper stop point H1. The instruction group 67 stores the order for the full downward or unrolling movement of the blind and carries out this order so that the blind is unrolled completely until the automatic stop motion 1 stops the rotation of motor 2.

If, after actuating anyone of said switches M or D, for instance D, the user wishes to discontinue instantaneously the rotation of motor 2, he depresses briefly and simultaneously both switches M and D. When the groups of instructions 62 and 63 have been carried out, since the answer to the checking action of instruction group 65 is no, the instruction group 80 checks that the blind washing operation is in course. Since the answer is no, the instruction group 68 delivers the order for stopping the motor 2.

If the user has depressed switch M (UP) before actuating the set of switches M and D, the answer to instruction group 80 is positive, and the instruction group 66b checks that switches 31, 32 are both opens, which means that stud 5 is located at that time between the lower stop points B1 or B2 and the first upper stop point H1 in rocker 6. If the answer to this check is no, the instruction group 68 will cause the motor to be stopped immediately. If the answer is yes, the motor rotation is not discontinued instantaneously but only when the stud has reached a location above the first upper stop point H1.

If, when the blind is in its fully unrolled condition, the user wishes to change the angular position or orientation of blades 4 . . . , in order to obtain a predetermined lighting, he depresses simultaneously both push-button switches PL (=Plus) and MS (=Minus). After carrying out the instructions of groups 62 and 70, the instruction group 71 checks that switches PL and MS have been properly depressed simultaneously and if the answer is yes the instruction group 82a will check whether register R1 is in state 1 or not. The answer is no, since stud 5 is not inside the rocker between stop points B2 and H1, the instruction group 81 will store the order for introducing the stud into the rocker, which corresponds to a request for changing the blade inclination. Then, the instruction group 75 checks whether switch 32 is open or closed. This switch 32 is closed, since stud 6 is above the stop point B1, the answer is no and the instruction group 77 controls the upward movement of said stud until it reaches the first upper stop point H1. When the stud clears the first lower stop point B1, switch 32 is opened (FIG. 6). When the stud penetrates into the rocker 6 at the first upper stop point H1, switch 31 is closed (FIG. 6) and the instruction group 77 causes the second register R2 to assume his state 1 since the stud has reached this first upper stop point H1, and causes the motor to rotate in the opposite direction while re-opening switch 31, switch 32 remaning open. When stud 5 reaches the second lower stop point B2, switch 32 is closed (FIG. 6), switch 31 remaining open and the instruction group 77 then deenergizes the motor to stop same and causes the first register R1 to assume state 1. When the instruction group 78 checks if the stud is stopped just at the second lower stop point B2, the answer is yes and the instruction group 79 controls a brief movement of rotation of the motor and reduction gear unit in the direction opposite the preceding direction, until switch 32 is re-opened, as observed in this case for switch 31. The resulting blade position corresponds in this example to a maximum orientation of the blades.

If, initially, the blind has not been fully unrolled and, for example, the answer to the instruction group 75 is a positive one, switch 32 being open since the stud is located above the first lower stop point B1, the instruction group 76 controls the downward movement of the blind until stud 5 has reached the first lower stop point B1. Switch 32 will stop at that time, when switch 31 has already been opened. The instruction group 76 will then stop the motor. The instruction groups 77,78,79 then operate as described hereinabove.

If the user, while the stud 5 is located inside the rocker 6, depresses simultaneously both switches PL and MS, the instruction group 82a will check if the first register R1 is in state 1 or not. The answer is positive since the stud is already inside the rocker 6 between stop points B1 and B2. As the answer to the check carried by instruction group 78 is a negative one, no order is carried out.

If the user now wishes to reduce the blade orientation, he simply depresses push-button switch MS (=Minus) and, as already described hereinabove, the instruction groups become operative and the instruction group 71 checks that both push-button switches PL and MS have properly been depressed simultaneously. If the answer is no, the instruction group 82b checks the 1 state of register R1. The answer is yes since the stud is inside the rocker 6 between stop points B2 and H1, and the instruction group 72 ascertains that only switch PL was depressed. The answer is no, therefore the instruction group 74 will control the upward movement of the stud until it reaches the first stop point H1, as long as push-button switch MS is depressed by the user.

If this switch MS is released before the stud reaches the first upper stop point H1, the instruction group 74 stops the motor rotation, switches 31 and 32 remaining in the same state. If switch MS is held until the stud 5 reaches the first upper stop point H1, switch 31 will close at that time, switch 32 remaining open and the instruction group 74 stops the motor rotation. When push-button switch MS is released, the instruction group 78 checks stud 5 is stopped just at one of the stop points B2 or H1. If yes, the instruction group 79 will control a brief rotation of motor 2 in the opposite direction with respect to its preceding direction of rotation, until switch 31 is re-opened, as in the case of switch 32. The blade orientation thus obtained corresponds to the minimum blade orientation.

The purpose of the brief motor rotation obtained with the assistance of instruction group 79 in case the stud were stopped inside the rocker in anyone of its two end positions B2 or H1 (maximum or minimum blade orientation), is to set both switches 31 and 32 in the same state (open or closed), thus forming the microcomputer that the stud is actually located between stop point B1 (or B2 in this case) and stop point H1. This provides a safety measure in case of accidental cut-off in the supply mains which might involve the loss of data contained in the volatile memory of the microcomputer. The position of stud 5 between B2 or B1, and H1 is detected when the main supply is restored by the identical position (for example the open position) of both switches 31 and 32.

If, when the blades are in their above-described minimum orientation position, the user wishes to increases this orientation, he simply depresses the push-button switch PL. After carrying out the instructions of groups 62,70,71 and 82b as described in the foregoing, group 72 checks the depression of push-button switch PL alone, then the instruction group 73 controls the downward movement of stud 5 towards point B2, as long as push-button PL is in its depressed position. The mode of operation is similar to that of instruction group 74.

If the user depresses only one of said push-button switches PL or MS while stud 5 is not inside the rocker, the answer to the check action of instruction group 82b is negative, like the answer to the check action of instruction group 78, and no order is carried out.

If, when the blades are in any random orientation the user wishes to unroll the blind completely, he depresses the push-button switch D. At the end of the execution of the instructions of groups 62, 63 and 65, instruction group 66a checks whether the switches 31 and 32 are in the same (open) state. or not. The answer is positive since the stud is located between one of the lower stop points B1 or B2 and the first upper stop point H1. The instruction group 80b checks whether the blind is being unrolled or not, and since the answer is no, the instruction group 82c checks whether register R1 is in its 1 state. The answer is positive since the stud 5 is inside the rocker 6 between stop points B2 and H1. Then the instruction group 69 stores the order for unrolling the blind, and controls during a first time period the upward movement of stud 5 towards point H1. Its passage at point H1 is detected through the closing of switch 31, the other switch 32 remaining open. During the passage at this point H1, certain instructions from group 69 start a time-lag period of about one second in this example. This time-lag is relatively short but nevertheless sufficient to enable the stud 5 to escape from the outlet 11 of rocker 6 and reach the second upper stop point H2. Switches 31, 32 remain in their preceding positions. Then the instruction group 69 reverses at this point H2 the direction of rotation of the motor and causes the blind to unroll completely, as described in a preceding part of this specification with reference to instruction group 67. Finally, the instruction group 69 causes the first register R1 to assume its state 0, the stud 5 being outside the rocker 6.

If an accidental cut-off occurs in the mains supply while the stud 5 is located either in the slide groove between stop points H1 and B1, or in the rocket between stop points B2 and H1, both registers R1 and R2 are restored immediately to their 0 state. If the user then depresses push-button switch D, after carrying out the instructions of groups 62,63,65, 66a, 80b, the instruction group 82c checks if the first register is in its 1 state. The answer is no, even if stud 5 is actually inside the rocker between stop points B2 and H1. The instruction group 83 checks whether the second register R2 is in its 1 state. The answer is no, since the stud is below stop point H1 without having been at least once above this point H1 since the system was energized after a break. The instruction group 69 then operates as described hereinabove, until the blind has been lowered completely.

The function of instruction group 83 disclosed hereinabove is to provide a correction to the negative answer to check action 82c, which corresponded to a stud position outside the rocker. The negative answer to check action 83 prevents the instruction group 67b from controlling a complete downward movement of the blind while the stud is in fact still inside the rocker, a condition most likely to cause serious damages to the blind.

What is claimed is:

1. Control system in combination with roller-blinds or like apparatus capable of rotating between an upper position and a lower position, said roller-blinds actuatable by means of an electric motor and reduction gear unit associated with an automatic stop motion adapted to stop the rotation of said unit when the roller-blind is in either of its two endmost upper and lower positions, said roller-blind comprising swivel blades kinematically connected to a master blade, said master blade comprising at least one end of a stud adapted to cooperate with a corresponding fixed rocker, each rocker comprising, for engagement by said stud, a downward inlet and an upward outlet interconnected by a hollow guide path substantially parallel to the slide grooves of said blind, said hollow guide path comprising a lower inclined extension diverging from said slide grooves and resilient lock means permitting the passage of said stud through said inlet only in the upward direction, said control system comprising, for each stud, a first lower stop point in said slide groove below said rocker inlet for temporarily stopping the downward movement of said stud, a first upper stop point in said hollow guide path below said rocker outlet for temporarily stopping the upward movement of said stud, a second lower stop point disposed substantially at the lower end of said lower inclined extension of said hollow guide path, said second lower stop point corresponding to a position of maximum orientation of said master blade, and a second upper stop point in said slide groove above said rocker outlet for temporarily stopping the upward movement of said stud subsequent to the exit of said stud from said hollow guide path in said rocker, said control system further comprising auxiliary means including a pair of switches the operation of which is subordinated to the rotation of the roller-blind winding tube connected in turn kinematically to said motor and reduction gear unit, wherein the only function of said auxiliary means consists in detecting the position of said stud, a first switch of said pair of switches assisting in stopping said motor and reduction gear unit when said stud is at its first upper stop point, the second switch of said pair of switches assisting in stopping said motor and reduction gear unit when said roller-blind is in a predetermined lower or unfolded position corresponding for said stud to either said first lower stop point if said stud is in said slide groove or if said stud is in said inclined extension of said hollow tube guide to said second lower stop point, whereby said stud is liable to be in any one of three possible sections, namely a first section between one of said lower stop points and said first upper stop point, or a second section at said first upper stop point, or above said first upper stop point, or at one of said lower stop points, or a third section below said first lower stop points, three relative states of said switches corresponding to said sections, respectively, so that a first switch is closed and the second switch is open, or the second switch is closed and the first switch is open, or both switches are in the same state, open or closed, other control switches as well as said first and second switches of said auxiliary device being connected via input interfaces to the input terminals of a microcomputer having its output terminals connected to two output interfaces adapted to actuate said motor and reduction gear unit in both directions of rotation respectively, the non-volatile memory of said microcomputer having stored therein a program for controlling said motor and reduction gear unit, said program being adapted to determine which control switches have been actuated, check the validity of the orders issued by said switches and transmit said orders to said motor and reduction gear unit as a function of the relative state of said first pair of switches of said auxiliary device and/or as a function of the state 1 or 0 of a first register of said non-volatile memory of said microcomputer, said state 1 or 0 corresponding or not to a position of said stud in said rocker between said second lower stop point and said first upper stop point, said second upper stop point of said stud being determined as a function of a time-lag started by said control program, when said stud clears said first upper stop points towards said rocker outlet.

2. The control system of claim 1, wherein said control program comprises an instruction group for checking the state 1 of said first register which, when the switch controlling the downward or unfold movement of said roller-blind has been actuated, and in case the response to said check is a negative one as a consequence of a break-up in the mains supply, is adapted to cause a first group of instructions to be carried out for checking the state 1 of a second register which corresponds to the fact that said stud has already been located once at said first upper stop point or above said first upper stop point, since the system was energized so that no break-up took place in the mains supply since then, said first group of instructions being adapted, in case the response to said check is a negative one, as a consequence of a break-up in the mains supply, to cause another second group of instructions to be carried out for sequentially storing the roller-blind unfolding order in said memory, controlling the upward movement of said stud towards said first upper stop point start a time-lag when said stud clears said first upper stop point towards said second upper stop point, reversing the direction of rotation of said motor when said stud reaches said second upper stop point to permit the complete unrolling of said blind.

3. The control system of claim 2, wherein said control program comprises a third group of instructions for checking the relative state of said first pair of switches of said auxiliary device, said checking step being adapted, when a first switch of said pair of switches which controls the downward or unfolding movement of said roller-blind, is actuated, in case both of said pair of switches are in a predetermined relative state corresponding to the position of said stud between one of said lower stop points and said first upper stop point, for controlling the execution of a fourth group of instructions in order to check the state 0 or 1 of said first register and, if said first register is in state 1, control the execution of a fifth group of control instructions for sequentially memorizing the order for causing the downward or unfolding movement of said blind, controlling the upward or folding movement of said blind until said stud reaches said first upper stop point and then said second upper stop point, and then reversing the direction of rotation of said motor for unfolding said blind completely until said automatic stop motion stops said motor, and, if said first register is in its 0 state, control the execution of a further sixth group of instructions for controlling the downward movement and the complete unfolding of said blind, said third group of instructions for checking the relative state of said first pair of switches being such that, in case said first pair of switches are in a different relative state corresponding to another position of said stud, said sixth group of instructions for controlling the downward movement and the complete unfolding of said blind are carried out.

4. The control system of claim 1, wherein said control program comprises a first instruction group for checking, when two push-button switches are actuated simultaneously, the 0 or 1 state of said first register and, if said first register is in state 0 corresponding to a position of said stud outside said rocker, carry out a second group of instructions for checking the state of one of said pair of switches of said auxiliary device for controlling, when said one switch is in a first state corresponding to a position of said stud above said first lower stop point, a third group of instructions for causing the downward movement or unfolding of said blind until said stud reaches said first lower stop point, and then stopping the motor rotation and carrying out a fourth group of control instructions adapted to cause sequentially the upward movement of said stud up to said first upper stop point, reversing the direction of rotation of said motor and controlling the downward movement of said stud down to its second lower stop point, and eventually changing the state of said first register to 1, said second group of instructions for checking the state of one of said pair of switches of said auxiliary device being so established that when said one switch is in its second state corresponding to a position of said stud above said first lower stop point, it controls directly the execution of said group of control instructions.

* * * * *

UNITED STATES PATENT AND TRADEMARK OFFICE
CERTIFICATE OF CORRECTION

PATENT NO.   : 4,665,965
DATED        : May 19, 1987
INVENTOR(S)  : Pasquier et al It is certified that error appears in the above-identified patent and that said Letters Patent is hereby corrected as shown below:

Claim 1  Column 13, lines 60-61, change "said non-volatile" to -- the volatile --

Signed and Sealed this

Tenth Day of November, 1987

Attest:

DONALD J. QUIGG

Attesting Officer      Commissioner of Patents and Trademarks